United States Patent
Maloney et al.

(10) Patent No.: US 7,709,127 B2
(45) Date of Patent: May 4, 2010

(54) ELECTRO-CATALYTIC RECHARGING COMPOSITION

(75) Inventors: Kevin D. Maloney, Newport Beach, CA (US); Robert Dopp, Marietta, GA (US)

(73) Assignee: QuantumSphere, Inc., Santa Ana, CA (US)

(*) Notice: Subject to any disclaimer, the term of this patent is extended or adjusted under 35 U.S.C. 154(b) by 581 days.

(21) Appl. No.: 11/745,957

(22) Filed: May 8, 2007

(65) Prior Publication Data

US 2008/0280172 A1    Nov. 13, 2008

(51) Int. Cl.
*H01M 8/04* (2006.01)
*H01M 8/18* (2006.01)

(52) U.S. Cl. .............................. 429/34; 429/40; 429/12; 977/948

(58) Field of Classification Search ........................ None
See application file for complete search history.

(56) References Cited

U.S. PATENT DOCUMENTS

| | | | |
|---|---|---|---|
| 2005/0084720 A1* | 4/2005 | Becerra et al. | 429/13 |
| 2006/0263672 A1* | 11/2006 | Lee et al. | 429/39 |
| 2008/0280187 A1* | 11/2008 | Sadamoto et al. | 429/34 |

* cited by examiner

*Primary Examiner*—John S Maples
(74) *Attorney, Agent, or Firm*—Knobbe Martens Olson & Bear, LLP

(57) ABSTRACT

A composition useful for the fueling and refueling of electrochemical devices is described. The composition comprises an ion-conducting medium such as an electrolyte, and catalyst nanoparticles. Unlike traditional electrodes, such as those typically used in electrolyzers and fuel cells, the inventive composition may be quickly drained from the device and refilled to maintain maximum cell performance. In addition, the electro-catalytic charging composition can be stored as a solid for safe handling; for example in a portable cartridge.

1 Claim, 3 Drawing Sheets

ELECTRO-CATALYTIC RECHARGING COMPOSITION

BACKGROUND OF THE INVENTION

1. Technical Field

The inventions disclosed herein generally relate to a composition used for the fueling and re-fueling of electrochemical devices.

2. Related Art

A fuel cell is a device that converts chemical energy directly into electrical energy. They typically operate with higher efficiencies than traditional combustion engines. In addition, emission of greenhouse gasses from fuel cells is reduced or eliminated. The prospect of affordable, clean fuel for stationary and transportation applications are several of the driving forces behind the Hydrogen Economy, where the energy infrastructure is based on hydrogen instead of oil. Liquid hydrocarbon fuels, such as methanol, are also advantageous in fuel cells. Fuel cell electrodes and devices have been previously described in U.S. Ser. No. 60/896,722. The disclosure of this application is incorporated herein by reference.

Devices that are configured to electrochemically convert reactants, for example water, into products such as hydrogen and oxygen when energy is applied are generally known as electrolyzers. For an electrolyzer to operate with high efficiency, the amount of product produced during reaction should be maximized relative to the amount of energy input. In many conventional devices, low catalyst utilization in the electrodes, cell resistance, inefficient movement of electrolyte, and inefficient collection of reaction products from the electrolyte stream contribute to significant efficiency loss. In many cases, low efficiency is compensated for by operating the cell at a low rate (current). This strategy does increase efficiency; however, it also lowers the amount of products that can be produced at a given time. The electrolyzer described in the preferred embodiments can operate both at high rates and efficiencies. Electrolysis electrodes and devices have been previously described in U.S. Ser. No. 11/716,375. The disclosure of this application is incorporated herein by reference.

Platinum is highly catalytic for hydrogen or hydrocarbon oxidation and oxygen reduction in gas diffusion electrodes for a variety of fuel cells, or splitting of reagents such as water in electrolysis cells. However, this noble metal is a rapidly depleting non-renewable resource and is consequently expensive. Current price for bulk platinum black is $75.00/gram. The associated cost of a platinum deposited electrode, typically loaded anywhere from 2-8 mg/cm$^2$, is widely considered to be a hurdle to widespread commercialization. With the gaining demand for alternative energy sources by consumers, efficient catalysts, new fuel cell electrodes and designs must be discovered to alleviate the demand and expense of platinum. Based on this, considerable effort is being dedicated to find an alternative catalyst which can match or exceed platinum's electrical performance. Method of synthesis of metal nanoparticles has been previously described in U.S. Ser. No. 10/840,409, as well as their use in air cathodes for batteries in U.S. Ser. No. 10/983,993.

A fluidized bed reactor (FBR) is designed to carry out chemical reactions that take place between materials solids, and liquids and/or gasses. In this type of reactor, a gas or liquid is passed through catalyst particles such that the catalyst particles are supported by an upflow of gas. The gas should have a significant enough velocity such that the catalyst particles remain suspended. The FBR is widely used in the chemical industry because of excellent heat and mass transfer characteristics. However, the use of FBRs is relatively unexplored in conjunction with electrochemical cells, and has not been previously demonstrated with catalyst nanoparticles. Because the catalyst particles can be suspended in a liquid electrolyte, it is possible to re-fuel the electrochemical FBR when the electrolyte is depleted or the catalyst becomes inactive.

SUMMARY OF THE INVENTION

In one aspect of the invention, a high-surface electro-catalytic recharging composition is provided. The composition may comprise catalytic metal particles, preferably at the nanoscale, and an ion-conducting medium. When immersed within an electrolyte, the composition can move freely and the nanoparticles may substantially make contact with or infuse into a metallic surface that may also have extremely high surface area. This metallic surface may function as both a portion of the electrode and a current collector used in conjunction with the electro-catalytic composition in an electrochemical device such as a fuel cell or electrolyzer.

With at least one preferred embodiment, regardless of electrochemical cell or system design, the liquid electro-catalytic recharging solution can be removed from the device and replaced with fresh solution if so desired. For example, should the electrolyte and/or nanoparticles in the fluidized bed electrode decompose over time or extended use, it can be discharged or drained from the device and replaced with new solution. This process can be repeated for the duration of device life to maintain good performance.

In another aspect of the invention, the composition comprises a liquid composition of ion-conducting aqueous electrolyte and electron conducting catalyst nanoparticles. The electrolyte plus nanoparticles are an electro-catalytic, in that the solution promotes electron transfer between particles, and the electrolyte conducts ions. In one embodiment, the aqueous electrolyte conducts hydroxyl groups (OH$^-$) or protons (H$^+$), and most preferably the electrolyte is potassium hydroxide (KOH) or sulfuric acid (H$_2$SO$_4$).

The electro-catalytic composition can be applied to a variety of electrochemical systems, including a fuel cell or water electrolyzer. Again, regardless of electrochemical cell or system design, the liquid electro-catalytic solution can be removed from the device and replaced with fresh solution if desired. Preferably, the composition can be placed in a storage container, and be ready for use at any time.

In another embodiment of the invention, the electro-catalytic charging composition comprises a solid electrolyte and catalyst nanoparticles. At least one advantage of a solid phase is that storage of the inventive composition requires less space. In one application, the composition may be stored within a cartridge, for example, so that when it is desired to replace the electro-catalytic composition in the device, water can be inserted in a new cartridge and injected on-site.

Preferably, the container that stores the electro-catalytic composition should be configured to have a delivery port to the electrochemical device for ease of handling. This will reduce the possibility of skin contact and spills. In the case of the solid electro-catalytic charging composition, an additional port on the storage container may be useful, for the introduction of water before insertion into the device.

An electrochemical device, such as a water electrolyzer or fuel cell may employ an electro-catalytic charging composition. This composition comprises an ion-conducting electrolyte and catalyst nanoparticles. The composition may be in the solid or liquid state before use, and is preferably in the liquid phase during use. Most preferably, the composition establishes a fluidized bed in an electrochemical device and function as an electrode.

Use of the described composition as an electrode has significant advantages relative to electrodes typically employed in an electrochemical device. In a traditional electrochemical device, the electrodes are immobilized in the system. Should one of the electrodes be faulty or degrade during use, the system would have to be disassembled to remove and replace them. In addition, preparation of these electrodes may be costly.

Conversely, in the fluidized bed system, a portion or all of the electro-catalytic charging composition could be flushed from the system and replaced with fresh electro-catalytic charging material as needed. An additional advantage to the rapid flushing and replacement of the composition is that in many electrochemical devices, the concentration of electrolyte fluctuates over time or the electrode degrades. When this occurs, the electrode may not be operating at its highest efficiency. With respect to the described system, the spent electro-catalytic composition can be removed from the cell and be replaced with a fresh solution. In this case, operation of the electrochemical device may function similar to a gasoline tank on an automobile, namely to refill as fuel is depleted. Other advantages may include, depending upon the configuration, circumstances, and environment, the ability to scale the electrode to a wide variety of sizes, higher power, and the ability to minimize agglomeration by using nanosized particles.

The features mentioned above in the summary of the invention, along with other features of the inventions disclosed herein, are described below with reference to the drawings of the preferred embodiments. The illustrated embodiments in the figures listed below are intended to illustrate, but not to limit, the inventions.

DETAILED DESCRIPTION OF SOME PREFERRED EMBODIMENTS

In an electrochemical device employing a fluidized bed, a significant portion of the electrode may comprise catalytic metal particles dispersed in an ion-conducting solution, also known as an electro-catalytic charging composition. Because a significant portion of the electrode is fluidized, the electrochemical cell can be configured to operate horizontally, vertically, or any degree in between. Additionally, the electro-catalytic charging composition may be employed in a variety of cell designs, including, but not limited to flat plate or tubular structures.

Figure 1:
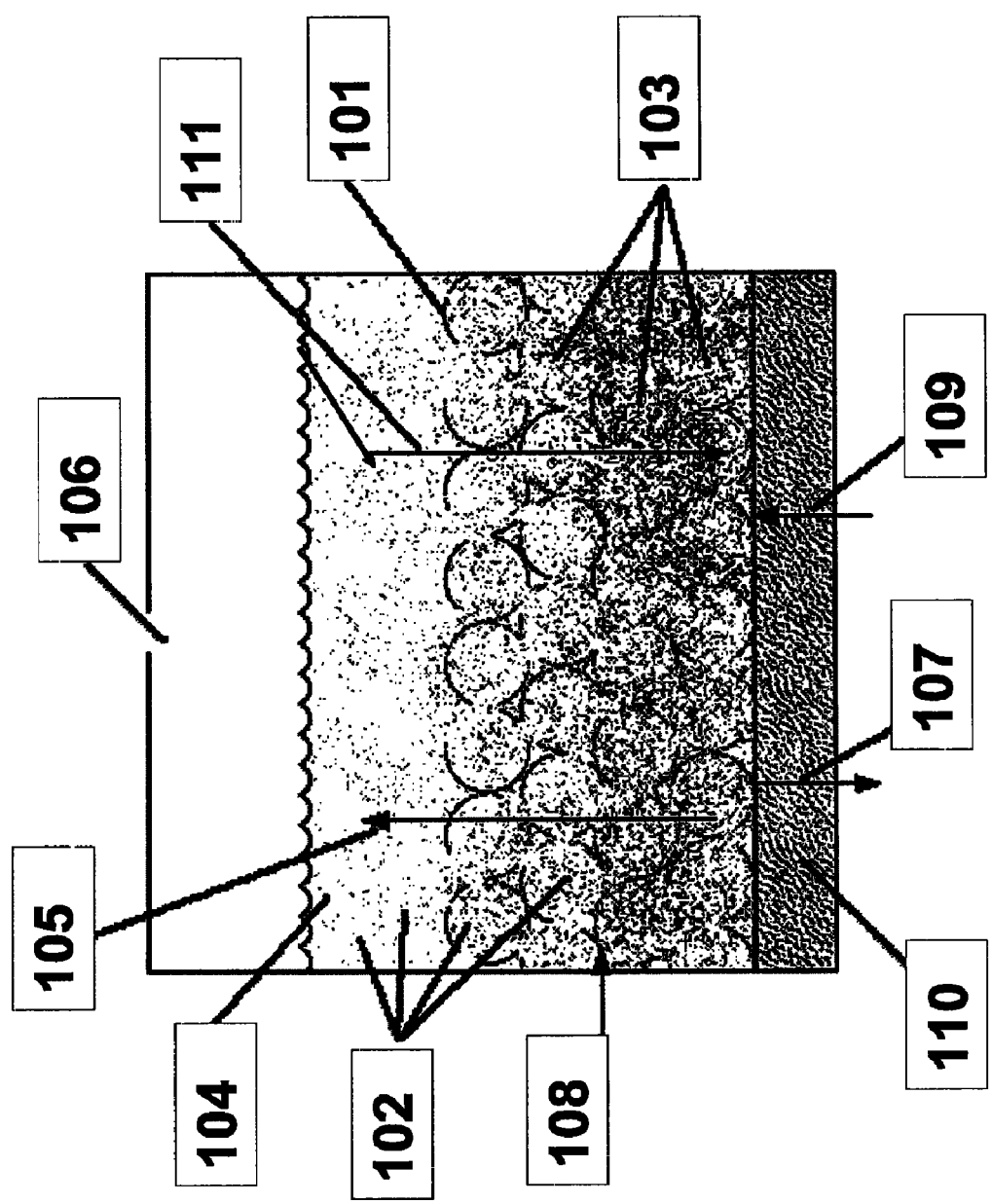
FIG. 1 is apportion of an electrochemical cell comprising the described composition.

Referring to FIG. 1, the inventions described herein may be used in an electrochemical device, a portion of which is shown with a high surface area metallic surface infused with electro-catalytic solution. In this example, the inventive composition is used in a water electrolysis device. Metallic surface 101 is preferably highly reticulate or porous, and can accommodate the infusion of nanoparticles 102 (shown as dots) that can diffuse throughout the void spaces within the interior of the metallic surface 103 and free moving in the electrolyte 104. When electricity 108 is applied to metallic surface 101, water in the electrolyte that comes through separator 110 is split, producing hydrogen gas 105. The hydrogen gas 105 may diffuse upwardly and out of the top surface of the electrode 101, bubbling to the surface of the electrolyte to escape the apparatus 106. This bubbling maintains fluidization of the electro-catalytic composition within the chamber. Meanwhile, hydroxyl ions 107 may move downwardly and permeate the separator membrane 110.

The electro-catalytic composition may work in a variety of electrochemical devices, including but not limited to water electrolysis cells, ammonia electrolysis cells, hydrocarbon electrolysis cells, carbon dioxide reduction cells, hydrogen fuel cells, and other direct oxidation fuel cells. The metal nanoparticles used in the composition will greatly depend on whether it is employed as oxidant or reductant. In addition, the composition may be useful in these devices regardless of electrochemical device design or orientation. In some cases, the electro-catalytic composition may be fluidized by flowing gas reagent, or may be fluidized in-situ by reaction products.

Figure 2A:
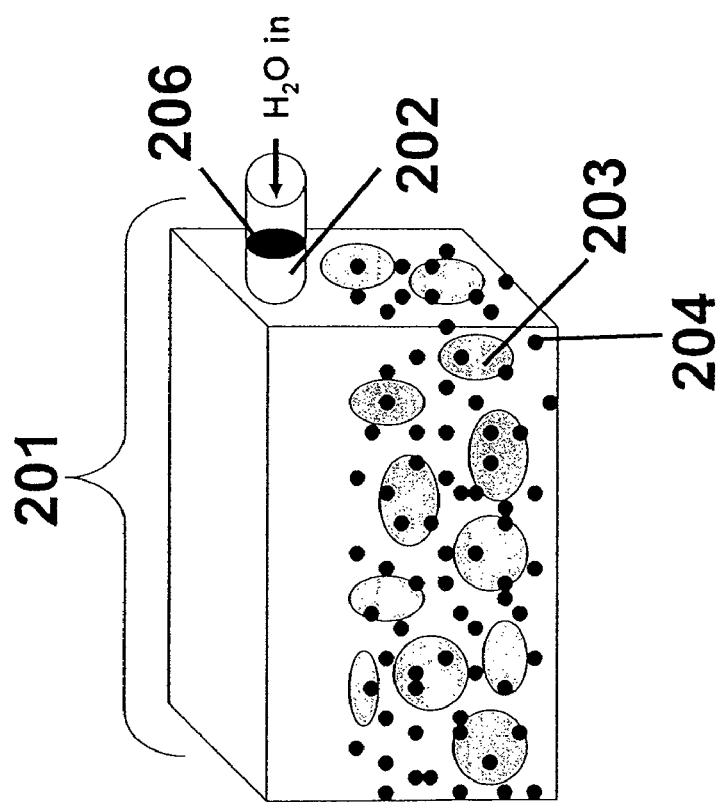
FIGS. 2A and 2B show one configuration of a portable cartridge containing an electro-catalytic composition in the solid phase before addition of water (2A) and in the aqueous phase after the addition of water (2B).
Figure 2B:
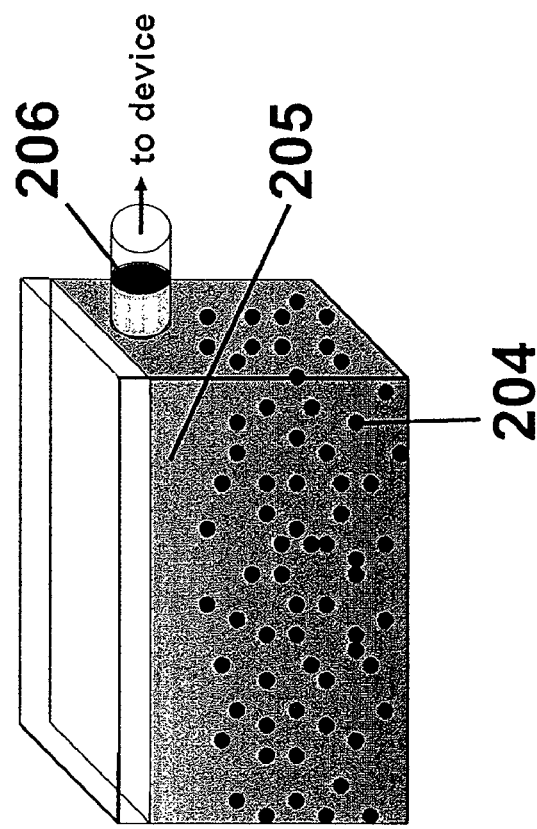

Referring to FIG. 2A, at least one aspect of the preferred embodiments involves the storage of the electro-catalytic charging composition in cartridge-like device 201. This cartridge may have any shape and can be scaled to any dimension, and can be prepared from any non-corrosive plastic or metal. It may be configured so as to be portable, or configured to semi-permanently affixed proximal to or adjacent to an electrochemical device to be serviced by such cartridge. Via port 202, nanoparticles 203 plus solid or liquid electrolyte 204 can be introduced. Subsequently, water is placed into the cartridge to prepare a certain concentration of aqueous electrolyte to form liquid electro-catalytic charging composition 205, as shown in FIG. 2B. Aqueous electrolyte concentration may range from 1 to 33%, and more preferably in the range of 10-33%. Port 202 features pressure diaphragm 206 which prevents leakage when materials are not moving into or out of the cartridge, or is not connected to an electrochemical device. It also reduces the probability of skin contact, reduces the risk of spills, and lowers the risk of the cartridge becoming pressurized.

Figure 3B:
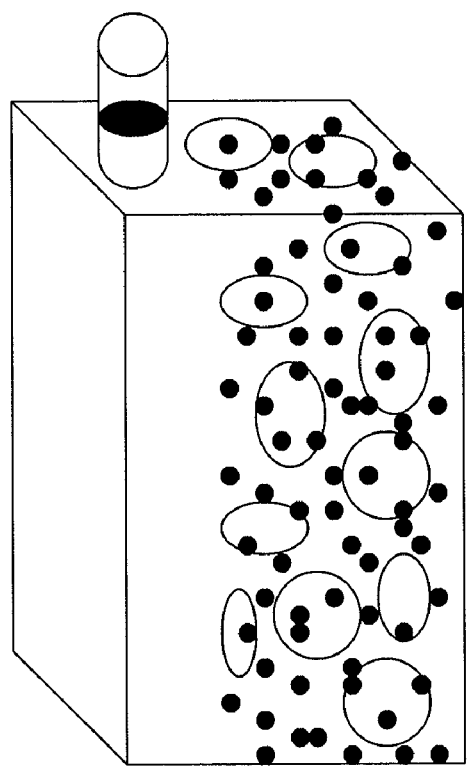
FIGS. 3A and 3B show another configuration of portable cartridge containing an electro-catalytic composition in the solid phase, with a quick release compartment barrier to segregate electrolyte and catalyst nanoparticles (3A), and after removal of the barrier in (3B).
Figure 3A:
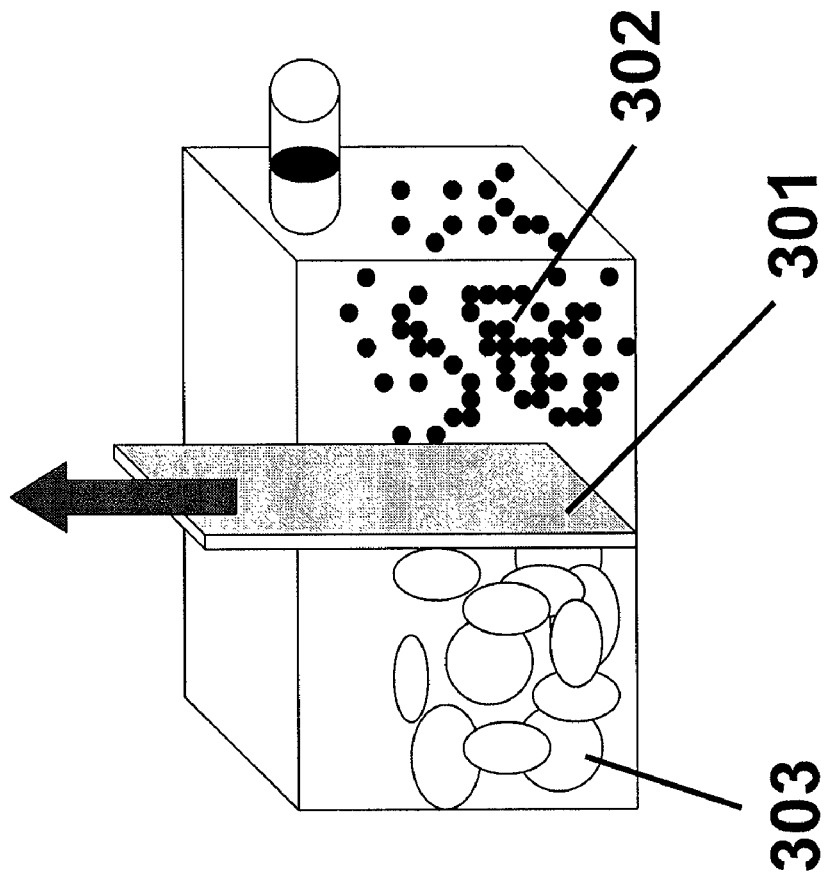

Certain electrolytes are corrosive, and may react with catalytic nanoparticles even in the solid state. Referring to FIG. 3A, this interaction is prevented via the use of a quick-release separator 301, which segregates the solid electrolyte and nanoparticles before use. The separator material should be corrosion resistant to prevent chemical degradation by the electrolyte. When separator 301 is released, catalytic nanoparticles 302 and solid electrolyte 303 can mix to form the electro-catalytic charging composition as shown in FIG. 3B, with water then subsequently added.

Preferably, the catalytic nanoparticles are less than one micron in effective diameter, and more preferably less than 100 nanometers in diameter. Most preferably, the metal nanoparticles are less than 50 nm in diameter such that substantial portion can infuse into the electrode. Larger particles tend to agglomerate to the extent that the void volume within the electrode can no longer accommodate their size. This results in a significant loss in efficiency.

The catalytic nanoparticles in the inventive electro-catalytic composition described herein are preferably selected from the group of metals from Groups 3-16, and the lanthanide series. More preferably, the metals are transition metals, mixtures thereof, alloys thereof and/or their respective oxides. Most preferably, the metal or metals are selected from the group consisting of nickel, iron, manganese, cobalt, tin, tungsten and silver, or combinations, alloys, and oxides thereof. The nanoparticles may be the same as, substantially the same as, or entirely different materials from those chosen for the electrode. Additionally, the nanoparticles may comprise a metal core with an oxide shell having a thickness in the range from 5 to 100% of the total particle composition. The metal core may also be an alloy.

Additionally, reactive surface area is increased by order of magnitude by operation with catalytic nanoparticles in the fluidized bed. In addition to the surface area of the porous or reticulate electrode, and nanoparticles infused into the electrode, the system capitalizes on the additional surface area of the fluidized catalytic nanoparticles. The increased catalytic behavior of the reactive metal nanoparticles, compared to the surface of the metal substrate alone, is high due to the very large number of atoms on the surface of the nanoparticles. By way of demonstration, consider a 3-nanometer nickel particle as a tiny sphere. Such a sphere would have 384 atoms on its surface and 530 within its interior, of the 914 atoms in total. This means that 58% of the nanoparticles would have the energy of the bulk material and 42% would have higher energy due to the absence of neighboring atoms. Nickel atoms in the bulk material have about 12 nearest neighbors while those on the surface have nine or fewer. A 3-micron sphere of nickel would have 455 million atoms on the surface of the sphere, 913 billion in the low energy and isolated interior of the sphere for a total of nearly one trillion atoms. That means that only 0.05% of the atoms are on the surface of the 3-micron-sized material compared to the 42% of the atoms at the surface of the 3-nanometer nickel particles.

The metal nanoparticles can be formed through any known manufacturing technique, including, for example, but without limitation, ball milling, precipitation, plasma torch synthesis, combustion flame, exploding wires, spark erosion, ion collision, laser ablation, electron beam evaporation, and vaporization-quenching techniques such as joule heating.

Another possible technique includes feeding a material onto a heater element so as to vaporize the material in a well-controlled dynamic environment. Such technique desirably includes allowing the material vapor to flow upwardly from the heater element in a substantially laminar manner under free convection, injecting a flow of cooling gas upwardly from a position below the heater element, preferably parallel to and into contact with the upward flow of the vaporized material and at the same velocity as the vaporized material, allowing the cooling gas and vaporized material to rise and mix sufficiently long enough to allow nano-scale particles of the material to condense out of the vapor, and drawing the mixed flow of cooling gas and nano-scale particles with a vacuum into a storage chamber. Such a process is described more fully in U.S. Ser. No. 10/840,409, filed on May 6, 2004, the entire contents of which is incorporated herein by reference.

The chemical kinetics of catalysts generally depends on the reaction of surface atoms. Having more surface atoms available will increase the rate of many chemical reactions such as combustion, electrochemical oxidation and reduction reactions, and adsorption. Extremely short electron diffusion paths, (for example, 6 atoms from the particle center to the edge in 3-nanometer particles) allow for fast transport of electrons through and into the particles for other processes. These properties give nanoparticles unique characteristics that are unlike those of corresponding conventional (micron and larger) materials. The high percentage of surface atoms enhances galvanic events such as the splitting of hydrogen or methanol to generate electrons, or the oxygen reduction reaction.

The foregoing description is that of preferred embodiments having certain features, aspects, and advantages in accordance with the present inventions. Various changes and modifications also may be made to the above-described embodiments without departing from the spirit and scope of the inventions.

What is claimed is:

1. A portable cartridge comprising an electro-catalytic fueling composition suitable for use in recharging an electrochemical system, the composition comprising an electrolyte and catalytic nanoparticles, wherein the composition is in solid phase suitable for storage within the portable cartridge, and wherein the portable cartridge is configured to permit the introduction of fluid therein to change the phase of the composition from solid to liquid.

* * * * *